United States Patent
Do et al.

(10) Patent No.: US 6,731,945 B2
(45) Date of Patent: May 4, 2004

(54) PRIVATE WIRELESS WAP SYSTEM

(75) Inventors: Thanh Van Do, Oslo (NO); Knut Brandrud, Oslo (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 429 days.

(21) Appl. No.: 09/749,526

(22) Filed: Dec. 28, 2000

(65) Prior Publication Data

US 2001/0007820 A1 Jul. 12, 2001

(30) Foreign Application Priority Data

Jan. 12, 2000 (NO) .......................................... 20000164

(51) Int. Cl.⁷ ................................................ H04Q 7/20
(52) U.S. Cl. .................... 455/463; 455/426.1; 455/462; 455/465; 455/414.1; 370/352; 709/238
(58) Field of Search ................ 455/426.1, 414.1–414.4, 455/462–463, 465; 370/338, 352, 401; 709/238, 250

(56) References Cited

U.S. PATENT DOCUMENTS

| | | | |
|---|---|---|---|
| 5,442,680 A | * | 8/1995 | Schellinger et al. ..... 455/426.1 |
| 5,930,719 A | * | 7/1999 | Babitch et al. ............. 455/462 |
| 6,112,091 A | * | 8/2000 | Van Puuenbroek et al. . 455/446 |
| 6,226,515 B1 | * | 5/2001 | Pauli et al. ............... 455/426.1 |
| 6,487,410 B1 | * | 11/2002 | Kontio et al. ................ 455/437 |
| 6,549,773 B1 | * | 4/2003 | Linden et al. ........... 455/426.1 |
| 6,553,240 B1 | * | 4/2003 | Dervarics .................... 455/566 |
| 6,658,251 B1 | * | 12/2003 | Lee et al. .................... 370/328 |
| 2001/0056502 A1 | * | 12/2001 | Hollstrom et al. .......... 709/250 |
| 2002/0094848 A1 | * | 7/2002 | Amin et al. ................. 455/572 |
| 2003/0211845 A1 | * | 11/2003 | Lohtia et al. ............ 455/414.3 |

OTHER PUBLICATIONS

Change Request (CR) to WAP Forum Ltd., Arjan te Marvelde et al, May 28, 1999.

* cited by examiner

Primary Examiner—William Trost
Assistant Examiner—Sharad Rampuria
(74) Attorney, Agent, or Firm—Nixon & Vanderhye P.C.

(57) ABSTRACT

A home WAP gateway system is disclosed that provides user selectable access from digital cordless telephone handsets adapted to WAP communications to services of a local home WAP gateway or to services of a remote WAP gateway in a public network. By a switching means responsive to a message from a handset comprising switching information, the system provides a communication path between a communicating handset and a home WAP gateway when the switching information specifies a predefined home WAP gateway path or between a communicating handset and a public or private telephone network when the switching information specifies a different path.

28 Claims, 5 Drawing Sheets

PRIVATE WIRELESS WAP SYSTEM

FIELD OF THE INVENTION

The invention relates to the field of wireless data communication, and particularly a system based on digital wireless telephone systems technology such as the standardised Digital Enhanced Cordless Telecommunication (DECT) and operating according to the Wireless Application Protocol (WAP) for providing access to local data applications and data files on a private "home" WAP gateway.

Without getting as much attention as cellular phones, cordless telephones (CT) are becoming widespread consumer products, and they are paving the way towards ubiquitous low cost personal communications networks. The cordless telephone systems were first manufactured and made commercially available in 1980s. They operate solely as an extension telephones to a transceiver connected to a subscriber line on the public telephone network (PTN) and are primarily for in-home use. They enhance fixed telephones by offering more freedom and higher mobility degree, i.e. allowing the user to operate in a wider area. Cordless telephone systems are generally full duplex communication systems that use radio to connect a portable handset to a dedicated base station, which is then connected to a telephone line associated with a specific telephone number on the public telephone network (PTN). In the first generation, the portable unit communicates only to the dedicated base unit and only over distances of a few tens of meters. Cordless telephone systems provide the user with limited range and mobility, as it is usually not possible to maintain a call if the user travels outside the range of the base station. Typical second generation base stations provide coverage ranges up to a few hundred meters. FIG. 1 illustrates a typical state-of-the-art cordless telephone system.

CT2 is a digital version of the first generation, analogue cordless telephones, introduced in Great Britain. When compared with analogue cordless phones, CT2 offers good speed quality, is more resistant to interference, noise, and fading, and like other personal telephones, uses a compact handset with built-in antenna. The Digital European Cordless Telephone (DECT), later renamed to Digital Enhanced Cordless Telecommunication, is a universal cordless telephone Standard developed by the European Telecommunications Standards Institute (ETSI), issued in 1992.

The Problem Areas

Although digital cordless telephone standards such as DECT specify both voice and data applications, they are limited to the bearer level, that is the ISO-OSI physical and data link layers (layers 1 and 2) and are not sufficient to enable data applications on the handset (or portable unit).

Known Solutions and Problems with These

Generally, existing cordless telephone systems on the market allow only voice communication services on the handsets. Such a limitation is expected soon to be intolerable by the market now that the WAP enabled cellular phones are being launched. The need for a solution enabling access to data and applications both on the world wide web and locally on a PC or workstation via cordless telephone is getting more and more urgent. With the advent of the Internet and the arrival of new generation of handsets having larger displays, the demand for data applications for cordless telephone systems is imminent.

There are some activities in the "WAP Forum" aiming to define DECT as an access technology enabling WAP, and to specify how to implement it. A description in this regard is given in the document "CR to WAP" of May 29, 1999, Change Request to WAP Forum Ltd, San Francisco, by Arjan te Marvelde, Ericsson, and Dr. G. Kelnhofer, Siemens. However, these activities have focus on the protocol level, i.e. how should the protocol stacks be for different units (handset, Fixed part, WAP gateway, etc.). The main architecture for WAP over DECT is the standard WAP architecture where the public WAP gateway is own and administered by a network operator or a service provider. Such a WAP gateway will also serve a number of users having subscription to the network operator or service provider. As shown in FIG. 2, in the "WAP over DECT" architecture the user via his DECT handset can have access to a WEB/WAP server via a public WAP gateway. Such a solution will allow the DECT users to access data and applications residing on remote computers or servers which are in the World Wide Web. However, the architecture does not give direct local access to data and applications residing on a local PC or workstation.

At present the applicant is not aware of any solution that enables access to both data and applications on the web and those residing on a local PC or workstation via cordless telephone handsets.

OBJECTS OF THE INVENTION

It is an object of the present invention to extend the "WAP over DECT" architecture and thereby allow access from cordless telephone handsets to data and applications on the web as well as those residing on a local PC or workstation.

It is a further object of the present invention to propose a way to obviate the limitation in current cordless telephone systems and to enable all data application types, ranging from Web content access to management of the cordless telephone system itself by means of the Wireless Application Protocol (WAP).

BRIEF DISCLOSURE OF THE INVENTION

In order to enable data applications on digital cordless telephone systems which can be CT2, DECT or others, this invention promotes the introduction of the Wireless Application Protocol (WAP) in a single base station cordless telephone system. The invention proposes a new architecture for home WAP where a PC-based private WAP gateway is introduced. The private WAP gateway may be owned and administered by the user or user organisation as in the case of a small office or a private home. Such a private WAP gateway allows the user to have access to data applications located locally in his PC as well as those residing on a WEB/WAP server on the Internet.

The objects of the invention are met by a system comprising at least one local PC or similar computer device serving as a local WAP gateway, at least one DECT bases station, and one or more DECT handsets adapted to wireless communication with said at least one base station, wherein the DECT base station is connected to the local WAP server and optionally to a public communications network, the system further comprising a switching function for routing information traffic between the DECT handset and the selected WAP gateway.

DETAILED DESCRIPTION OF THE EMBODIMENTS

In the following, the present invention will be described by way of examples and with reference to the accompanying drawings.

Figure 1:
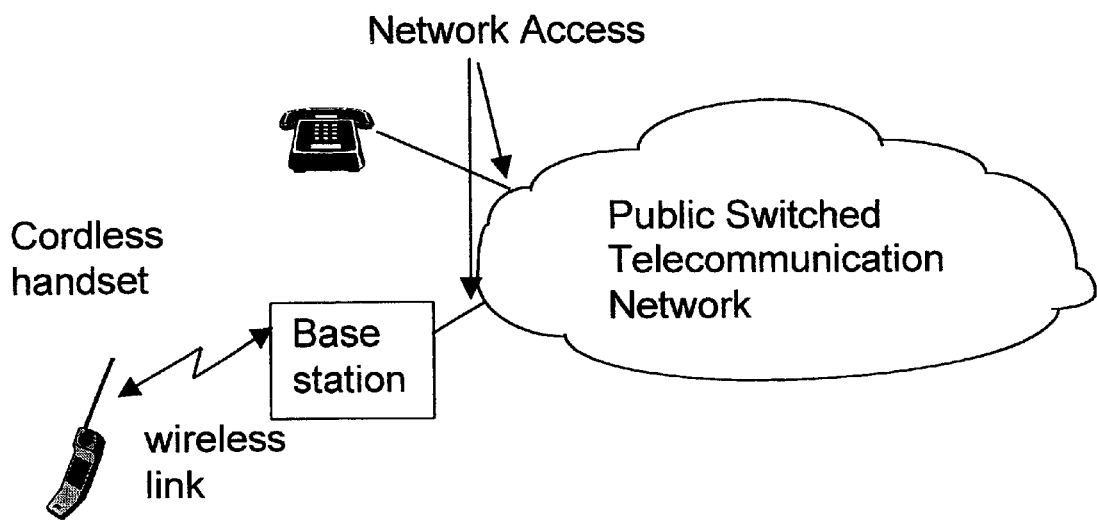
FIG. 1 is a schematic drawing illustrating a typical state-of-the-art cordless telephone system.
Figure 2:
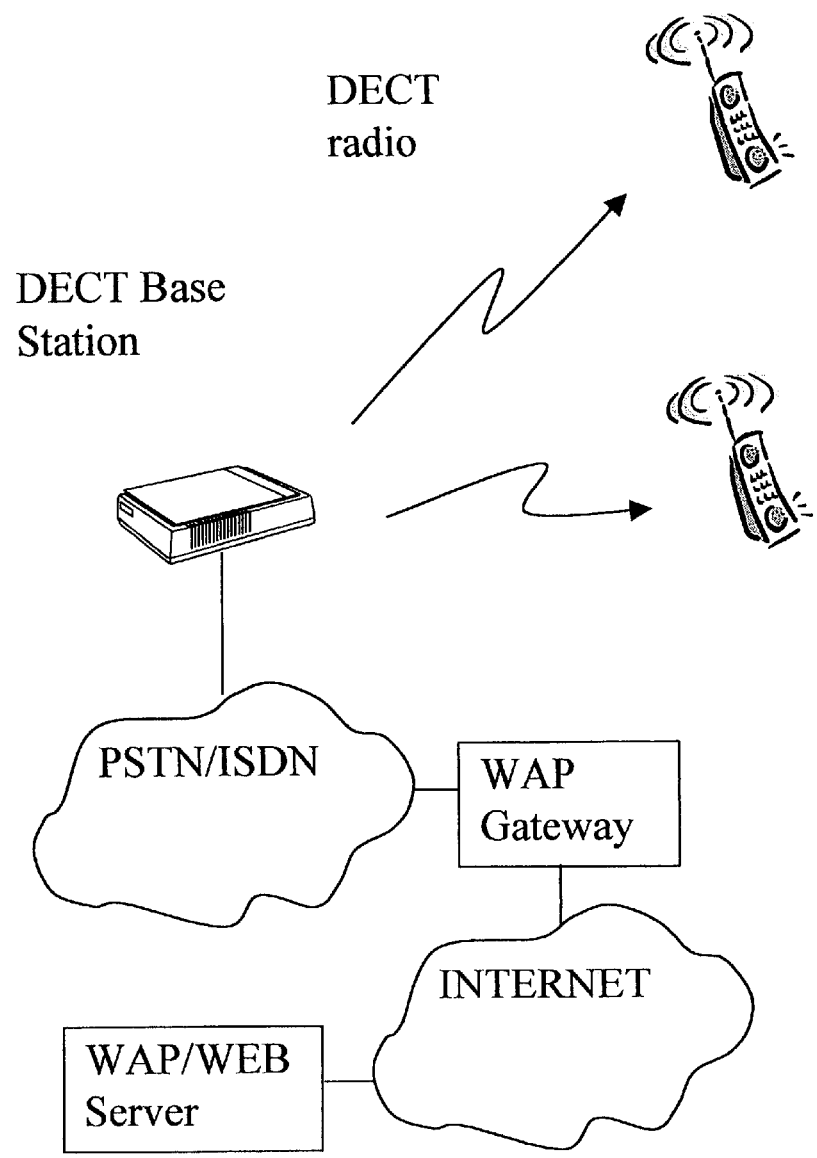
FIG. 2 is a schematic drawing illustrating a PRIOR ART proposed "WAP-over-DECT" architecture.
Figure 3:
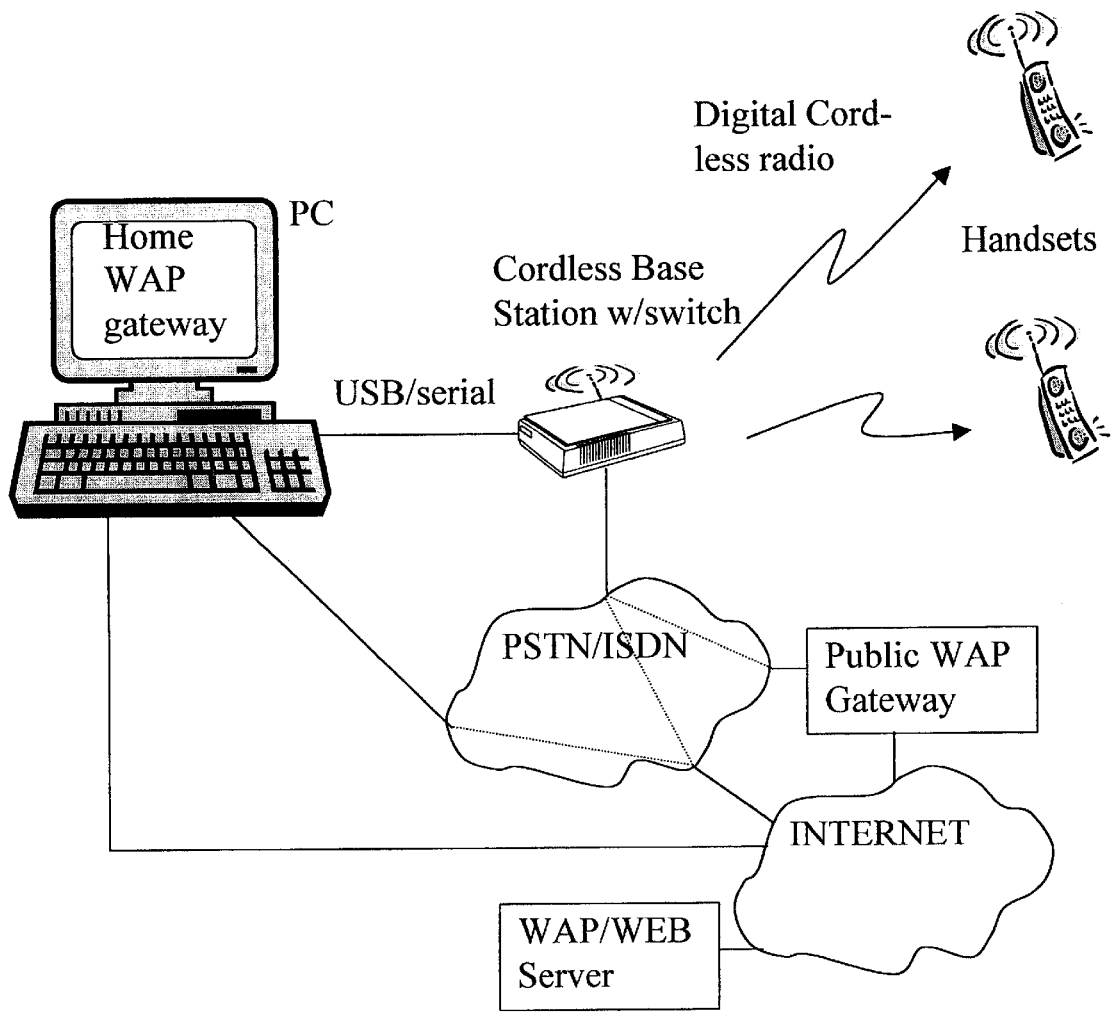
FIG. 3 is a schematic drawing of an example of a WAP cordless telephone system according to the invention.

As shown in the example of FIG. 3, the architecture of a first example of the "Home WAP cordless system" according to the invention could include the following main units:

- a home WAP gateway based on a personal computer (PC) or similar computer device,
- a Base station (also called Fixed Part in DECT terminology), and
- one to twelve handsets.

The PC is connected to a DECT cordless base station by a standard means for data communication such as USB (Universal Serial Bus), RS232 serial connection or other standard peripheral bus. The PC will provide the WAP gateway function. The WAP gateway function could include standard gateway functions, such as:

- a WAP protocol stack, a bearer adaptation for the cordless standard (DECT),
- a management unit,
- a context manager to correlate the device-to-gateway and gateway-to-server sessions,
- a compiler and encoder to convert WML to binary code, and
- an HTTP manager to manage the session between the gateway and the WEB/WAP application servers.

The connection of the PC to the Internet can be achieved in several ways. It can be done via for example TV cable or xDSL. The network connection can also be accomplished via a regular PSTN/ISDN data call. The connection for the data call may be established via the cordless base station or directly to a PSTN/ISDN network. The PC may also contain control and management software for the base station, and software for providing voice-based services like PBX and answering machine functions.

In the example of FIG. 3, the base station, which may also be referred to as the fixed part of the cordless system, in addition to the basic functions of a regular cordless base station, provides the switching function that permits to direct WAP data requests from the cordless handset to either the home WAP gateway function of the local PC or the public WAP gateway. It is contemplated that the switching function could be pre-configured via an interface on the base station, or it can be set upon request from the user via a cordless handset. The WAP data request is based on standard data communication capabilities provided by the cordless communication system.

Figure 4:
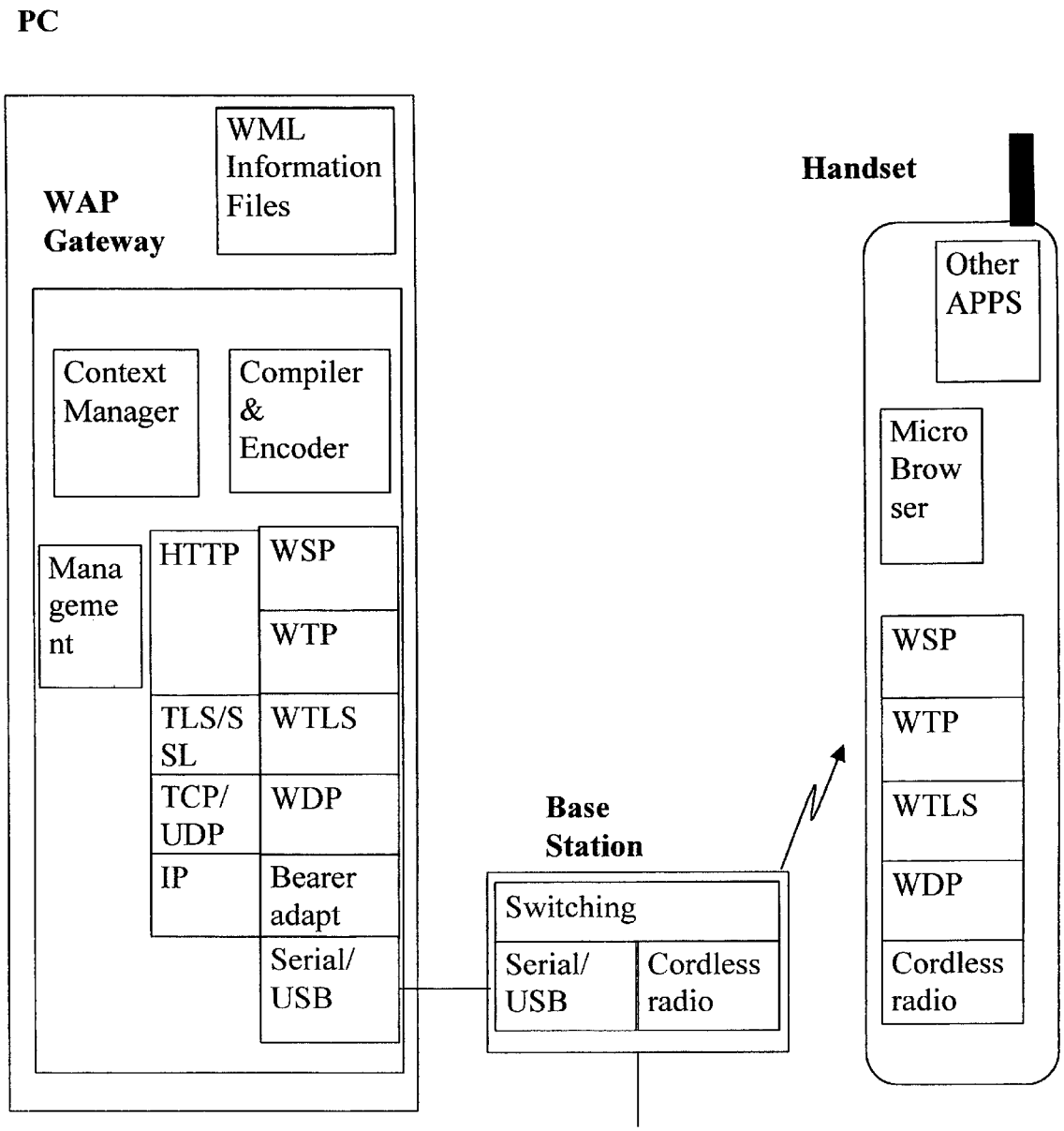
FIG. 4 is a schematic drawing illustrating an example of components in the WAP cordless telephone system shown in FIG. 3.

FIG. 4 shows components of a WAP cordless telephone system shown in FIG. 3, including the protocol stacks of the handset, of the base station and of the Home WAP gateway in the case where the home WAP gateway is used. It is important to note that the cordless radio does not indicate any specific radio protocol but general protocol layers 1 and 2 in the ISO OSI layers which are necessary to realise the radio link between the base station and the cordless handset.

The case where the public WAP is used is not part of invention and has been described by the referenced prior art. The cordless handset is equipped with a WAP protocol stack and a micro browser that is capable of handling the Wireless Mark-up Language (WML) and the WAP Application Environment (WAE). From the micro browser the user can choose to use either his "Home WAP gateway" or public WAP gateway:

To use his Home WAP gateway the user could specify:
home: <URI>
where <URI> is a standard World Wide Web Universal Resource Identifier.

For accessing a local file on the PC, the URI could be for example be specified as:
file://myfilename For an object or resource on the "web", the URI could be for example be specified as:
http://www.ericsson.com/

Upon receipt of the keyword home, the switching function in the base station will forward the data request to the Home WAP gateway in the PC via a local connection such as a serial or USB connection. The Home WAP gateway will carry a protocol conversion and assembling, and then forward the data request to the appropriate final destination.

To use a public WAP gateway the user may specify:
public: <URI>
where <URI> is a standard World Wide Web Universal Resource Identifier. It is worth noting that in this case the user can no longer access the local files on his PC.

Upon receipt of the keyword public, the switching function in the base station will forward the data request to public gateway that the user has subscription with. Depending on the network connection type and protocols, i.e. circuit switched or packet switched the base station will carry the appropriate actions to establish the connection with the public gateway in order to deliver the request.

Figure 5:
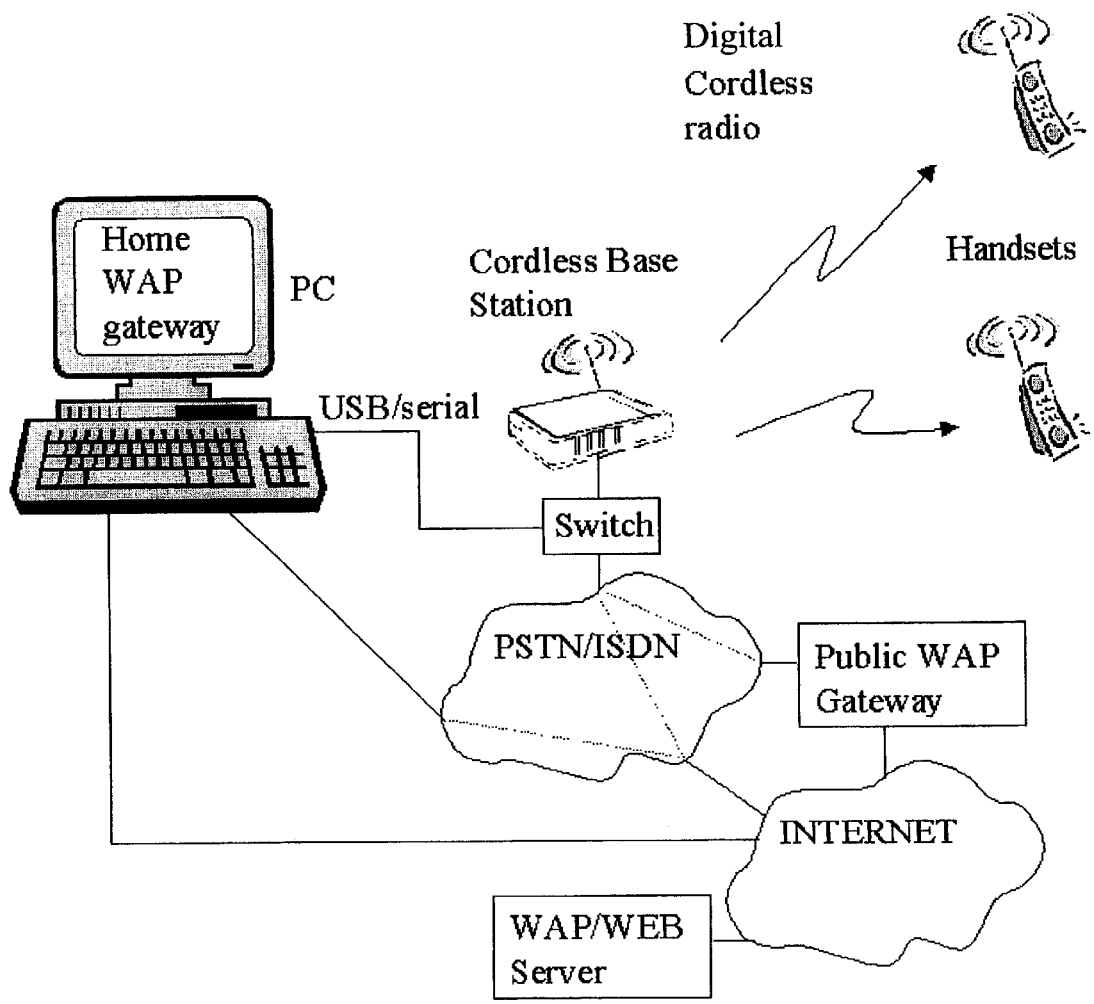
FIG. 5 is a schematic drawing of another example of a WAP cordless telephone system according to the invention

In FIG. 5 is shown another example of a "Home WAP cordless system" according to the invention. The system could include the following main units:

- a home WAP gateway based on a personal computer (PC) or similar computer device,
- a DECT cordless telephone base station (also called Fixed Part in DECT terminology) unit,
- a telephone line switching unit (could be an integral part of the home WAP gateway computer), and
- one to twelve handsets.

By assigning to the home WAP gateway one or more special telephone numbers that have characteristics which are significantly different from the numbers typically used by public telephone networks, the switching unit will be able to distinguish between calls made to the public telephone network such as PSTN or ISDN and calls made to the home WAP gateway. A call made to the home WAP gateway would be intercepted by the switching unit, and a connection would then be established between the home WAP gateway and the base station. Subsequently the user would access the home WAP gateway in the same way as any other WAP gateway.

A combination of digits that could be suitable for many telephone systems for assignment as a number for a home WAP gateway connection could for example be four or more consecutive zeros. In such a case, to connect with the home WAP gateway the user could specify a number such as:
0000.

For each call, combinations of digits which are different from the number or numbers assigned to the home WAP gateway will be disregarded by the switching unit in the sense that they will be routed through to the telephone line connection, as will any communications traffic associated with such calls.

Accordingly, to connect with a remote WAP gateway of a service provider on the public network, or for the sake of placing an ordinary telephone call, the user would specify a typical telephone number such as:

81007107.

It should be understood that the switching unit, shown in FIG. 5 as being connected to the telephone line interfaces of the cordless phone base station and the telephone network and to a communications interface of the home WAP gateway, could be an integral part of the home WAP gateway itself.

Uploading of software for and configuration of the switching means could be made from either the home WAP gateway, from the digital cordless telephone handset, from a device connected to the telephone network or via a dedicated interface of the switching means, or from a combination of any of the aforementioned.

Advantages

The present invention has multiple merits:

It extends the range of applications for the cordless phone user from voice to data applications.

It is probably the best way to enable data applications on cordless telephone system by using the Wireless Application Protocol. This is due to several reasons. Firstly, WAP is intended for mobile devices with small display, limited keypad, no pointing device, and limited processing power and memory capability similar to the capabilities of a DECT handset. The multi-bearer architecture of WAP makes it simple to adapt to DECT. Secondly, WAP does not, for the time being, have any serious competitor within the phone segment, and it has been accepted by a wide range of telecom manufacturer and operators and is on its way to become a de-facto standard. Thirdly, seen from a user's point of view it is much better to have the same interface on the DECT handset as on the cellular phone.

In particular, a system according to the invention may provide a highly competitive low-end alternative to screen-phones and similar low-end web services in order to provide simple data applications on home or small office phones.

What is claimed is:

1. A home WAP system for providing user selectable access from digital cordless telephone handsets adapted to WAP communications to services of a local home WAP gateway or to services of any remote WAP gateway in a public or private network, characterised in that the system comprises locally:
   a home WAP gateway device,
   a digital cordless telephone base station,
   one or more digital cordless telephone handsets adapted to WAP communications, and
   a means for communications switching,
   wherein the switching means is responsive to messages from a handset comprising switching information, and provides a communications path between a communicating handset and the home WAP gateway when the switching information specifies a home WAP gateway path or between a communicating handset and a public or private telephone network when the switching information specifies a different path.

2. A home WAP system according to claim 1, characterised in that the switching means is incorporated in the cordless telephone base station.

3. A home WAP system according to claim 2, characterised in that the cordless telephone base station is connected to the telephone network by means of a standard PSTN or ISDN connection, and to a standard communications port of the home WAP gateway device.

4. A home WAP system according to claim 2, characterised in that the switching information is specified as a URI.

5. A home WAP system according to claim 1, characterised in that the switching means is connected in-line with a standard PSTN or ISDN connection, and to a standard communications port or modem of the home WAP gateway device.

6. A home WAP system according to claim 5, characterised in that the switching information is specified as a predefined telephone number or other combination of digits.

7. A home WAP system according to claim 2, characterised in that the switching means is adapted to be user configurable.

8. A home WAP system according to claim 7, characterised in that the configuration of the switching means can be made from the handset.

9. A home WAP system according to claim 1, characterised in that the home WAP gateway includes one or more additional communication paths for connecting to public or private networks.

10. A home WAP system according to claim 1, characterised in that the digital cordless telephone system is a system according to the DECT or CT2 standards.

11. A home system cordless telephone apparatus operating according to a Wireless Application Protocol (WAP) and communicating with one wireless handset having a data processing device for operation of a handset computer application, comprising:
   a cordless telephone base station unit;
   a first communication port for connecting to a remote WAP gateway via a telecommunications network;
   a second communication port for connecting to a data communications port of a local WAP gateway via a local connection; and
   a switch responsive to an information request received wirelessly from the handset including an address to an information element,
   wherein the switch is arranged to establish based on the address:
      a first communication path for the information request between the handset computer application and the remote WAP gateway via the first communication port if the address specifies an information element located at a server reachable by the remote WAP gateway, and
      a second communication path for the information request between the handset computer application and the local WAP gateway if the address specifies an information element located at a server reachable by the local WAP gateway.

12. A home system cordless telephone apparatus according to claim 11, wherein the handset computer application is a WAP-application.

13. A home system cordless telephone apparatus according to claim 11, wherein the information request is a WAP information request.

14. A home system cordless telephone apparatus according to claim 11, wherein the information element located at the server reachable by the local WAP-gateway is a WAP-enabled information element or the information element located at the remote server reachable by the remote WAP gateway is a WAP-enabled information element.

15. A home system cordless telephone apparatus according to claim 11, wherein the local server or the remote server is a WAP-server or a WAP-portal.

16. A home system cordless telephone apparatus according to claim 11, wherein the information request includes switching or routing information represented by a "Universal Resource Locator" (URL).

17. A home system cordless telephone apparatus according to claim 11, wherein the information request includes switching or routing information represented by a telephone number or a combination of digits.

18. A home system cordless telephone apparatus according to claim 11, wherein the first communication port is adapted to a PSTN-interface or an ISDN-interface.

19. A home system cordless telephone apparatus according to claim 11, wherein the second communication port is adapted to support a digital computer communication interface.

20. A home system cordless telephone apparatus according to claim 11, wherein the switch is connected to a PSTN-interface or an ISDN-interface in the first communication port.

21. A home system cordless telephone apparatus according to claim 11, wherein the switch is pre-configurable by a user interface provided by a digital communications port arranged on the base station unit or a user interface provided by the cordless handset.

22. A home system cordless telephone apparatus according to claim 21, wherein the user pre-configurable switch is pre-configurable via a cordless handset.

23. A home system cordless telephone apparatus according claim 11, wherein the telecommunication network is a PSTN network or an ISDN network.

24. A home system cordless telephone apparatus according to claim 11, wherein the switch and the first and second communication ports are part of the base station unit.

25. A home system cordless telephone apparatus according to claim 11, wherein the switch is separate from the base station unit and the first and second communication ports are included in the switch.

26. For use in a home system cordless telephone system operating according to a wireless application protocol (WAP) that includes at least one wireless handset operating a handset computer application and a cordless telephone base station unit, comprising:

establishing a connection between the wireless handset and the base station unit, in response to an information request received wirelessly from the handset including an address to an information element, establishing a first communication path for said information request between the handset computer application and a remote WAP gateway via a telecommunications network if the address specifies an address of an information element located at a server reachable by the remote WAP gateway, and in response to an information request received wirelessly from the handset including an address to an information element, establishing a second communication path for said information request between the handset computer application and a local WAP gateway via a local connection if the address specifies an address of an information element located at a server reachable by the local WAP gateway.

27. The method in claim 26, wherein the information request includes switching or routing information represented by a "Universal Resource Locator" (URL).

28. The method in claim 26, wherein the information request includes switching or routing information represented by a telephone number or a combination of digits.

* * * * *